July 25, 1961 M. E. BONOMO ET AL 2,993,369
PRESSURE RESPONSIVE MEANS
Filed June 17, 1957
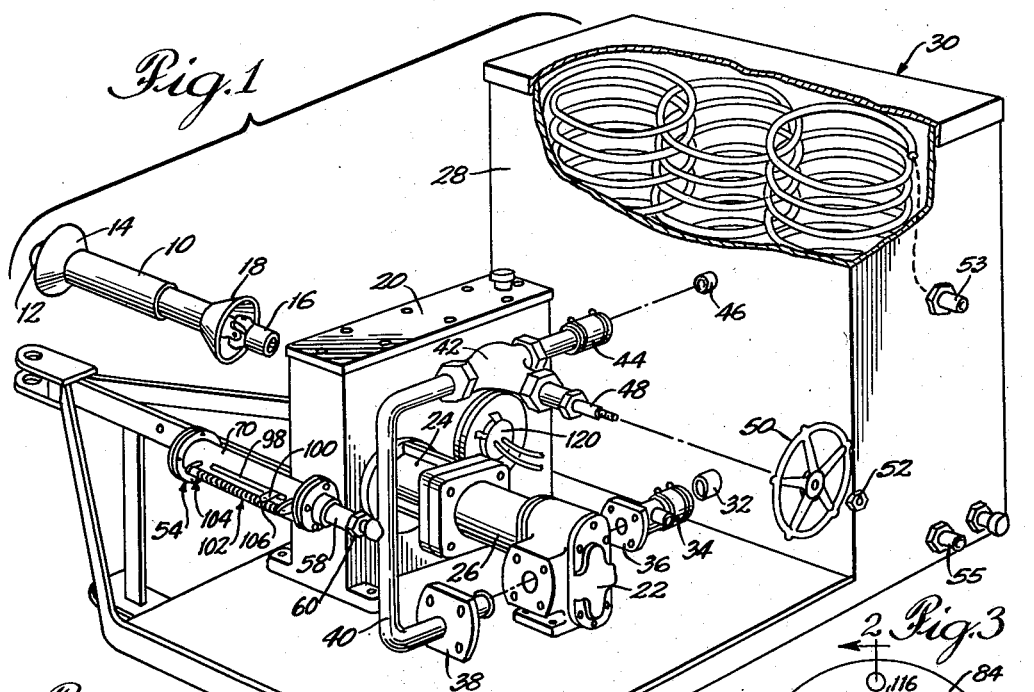
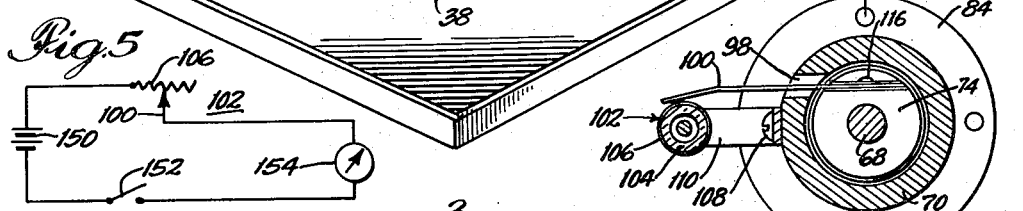
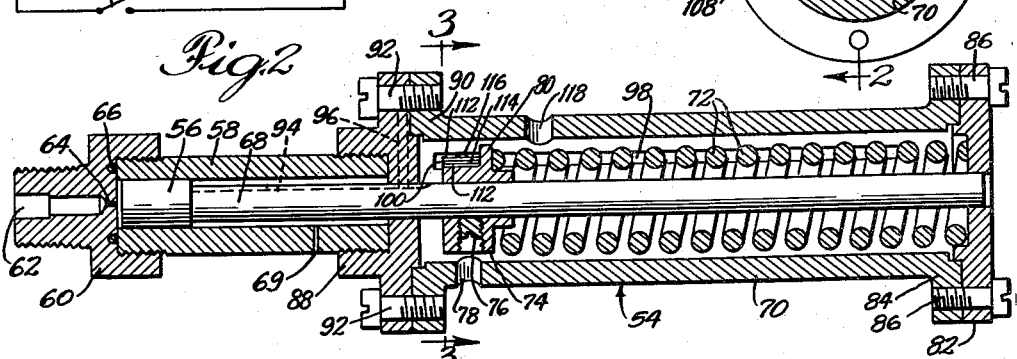
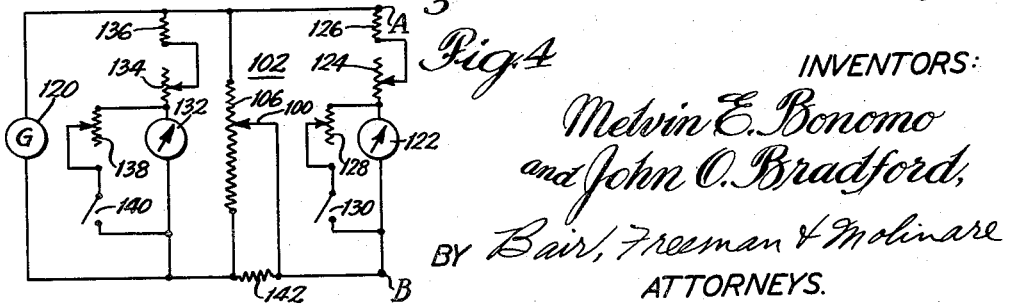
INVENTORS:
Melvin E. Bonomo
and John O. Bradford,
BY Bair, Freeman & Molinare
ATTORNEYS.

United States Patent Office 2,993,369
Patented July 25, 1961

2,993,369
PRESSURE RESPONSIVE MEANS
Melvin E. Bonomo and John O. Bradford,
Gibson City, Ill.
Filed June 17, 1957, Ser. No. 665,937
1 Claim. (Cl. 73—116)

This invention relates generally to measuring and indicating devices and more particularly to new and improved measuring and indicating devices responsive to fluid pressures, as for example, the fluid pressures in a dynamometer used to measure the horsepower of a vehicle engine.

This is a continuation-in-part of a co-pending application of Ellsworth W. Lapp, Serial No. 653,354, filed April 17, 1957, in which there is disclosed a self contained and portable dynamometer assembly adapted for testing engine performance, including horsepower of tractors, automotive vehicles and the like under actual field conditions. Briefly, the dynamometer assembly comprises a constant volume pump which forms a hydraulic circuit with an oil reservoir and a manually operable valve. The pump is driven by the power take off of the engine under test and the pressure built up in the hydraulic circuit is applied by a pressure hose to a hydraulically operated gauge on the front panel of the dynamometer assembly. The load on the engine can be varied by the valve in accordance with desired load conditions and the hydraulically operated gauge serves to correlate the oil pressure with the engine speed to provide an indication of engine horsepower.

It is a general object of this invention to provide new and improved indicating means which advantageously may be used with the above described dynamometer assembly.

More specifically, it is an object of this invention to provide a new and improved pressure transducer which controls the flow of current in an electrical circuit for providing electrical indications of the dynamometer hydraulic pressure and of the horsepower of the engine under test.

It is another object of this invention to provide electrical indicating means for a dynamometer which comprises a new and improved pressure transducer having a linear operating range substantially greater than that obtainable in prior art devices of comparable size.

It is still another object of this invention to provide an improved wide range pressure transducer, as described above, in which the prior art problems of leakage and break away friction effectively are resolved.

It is a further object of this invention to provide an improved wide range pressure transducer which is of relatively low cost construction and which is capable of providing accurate remote pressure indications.

It is a still further object of this invention to provide an improved pressure transducer, as described above, which is directly coupled to a potentiometer in the electrical indicating circuit for providing a more sensitive and accurate measurement of pressure functions.

It is a still further object of this invention to provide a new and improved electrical indicating means for indicating functions of pressure which is characterized by its wide range of operation and its relative simplicity of construction.

These and other objects are realized in accordance with a specific embodiment of the invention in which a pressure transducer of unique construction is illustrated as coupled to the hydraulic circuit of the portable dynamometer assembly disclosed in the above-identified co-pending application. In accordance with a feature of this invention, the transducer comprises a cylinder adapted to be coupled to the hydraulic circuit and enclosing a piston responsive to the fluid pressure within the circuit as built up from the operation of the constant volume pump by the engine under test.

Advantageously, the outside diameter of the piston and the inside diameter of the cylinder are made substantially equal to each other so as to form a tight and fully engaged surface fit between the piston and the cylinder. In one preferred form of the invention, the fit between the piston and the cylinder is such as to eliminate the need for any working fluid seals therebetween. In another preferred embodiment, a suitable seal, such as a block V packing is utilized with the piston. It will be appreciated by those skilled in the art that these arrangements have the advantage of eliminating the prior art problems of leakage and break away friction—factors which imposed serious restrictions on the operating range and linearity of such prior art devices.

The piston abuts a rod secured to a precision spring which serves to urge the piston against the force of the fluid in the hydraulic circuit. It is another feature of this invention that the pressure of the hydraulic fluid causes the piston to be displaced within the cylinder an amount which, due to the tight fit between the cylinder and the piston and to the characteristics of the precision spring attached to the latter, is linear over a range of fluid pressures far greater than any range of linear response provided by prior art devices of comparable size.

It is another feature of this invention that the displacement of the piston in response to fluid pressure is converted to an electrical indication on a suitable ammeter with a corresponding degree of accuracy. Advantageously, the ammeter dial is marked in functions of pressure to the end that either direct or remote indications of pressure, engine horsepower, or the like is provided.

In accordance with the further features of this invention, the electrical indicating circuit is provided with a suitable source of power which preferably may be a D.C. generator driven by the engine under test. In addition, the electrical indicating circuit is provided with suitable current limiting resistances and balancing potentiometers for enabling precision measurement of engine horsepower.

The above and other features of novelty which characterize the invention are pointed out with particularity in the claim annexed hereto and forming a part of this specification. For a better understanding of this invention, however, its advantages and specific objects attained by its use, reference is had to the accompanying drawing and descriptive matter in which is shown and described an illustrative embodiment of the invention.

In the drawing,

FIGURE 1 is a partially exploded and partially broken perspective view of a dynamometer, including a pressure transducer and potentiometer assembly, embodying the invention;

FIGURE 2 is a longitudinal cross section of the pressure transducer in accordance with the invention;

FIGURE 3 is a transverse cross section of the pressure transducer and potentiometer assembly taken substantially as shown on lines 3—3 of FIGURE 2;

FIGURE 4 is a schematic diagram of the electrical indicating circuit of the invention; and FIGURE 5 is a schematic diagram of an alternative electrical indicating circuit suitable for providing remote pressure indications.

Referring now to the drawing, and particularly to FIGURE 1, there is shown a specific illustrative portable dynamometer assembly embodying features of the present invention. An elongated tubular power take off shaft extension 10 is provided with a universal joint and coupler 12 at one end thereof to facilitate connection of the shaft extension 10 to the power take off of the engine to be tested. The outer end of a shaft extension 12 also is provided with a cup-shaped shield 14 to add safety to the use of the dynamometer assembly. The inner end of the shaft extension 10 also is provided with a universal joint and coupler 16 and a cup-shaped shield 18.

The coupler 16 is adapted to be connected through suitable shafts and gearing within the gear box assembly 20 to provide driving power for the constant volume hydraulic pump 22. Advantageously, hydraulic pump 22 is coupled to the power take off shaft extension 10 by the gearing within gear box assembly 20, a pinion shaft within the pump mounting bracket and pinion shaft bearing cage 24 and a pump drive shaft within the pump drive coupler housing 26. Thus, it will be appreciated that when the engine under test is operating, the hydraulic pump 22 is driven accordingly through the coupling and drive elements provided between the pump and engine.

The tank 28 of an oil reservoir 30 advantageously is filled with a suitable hydraulic fluid, such as oil, which is circulated by operation of the pump through a hydraulic circuit including tank 28, outlet 32 at the bottom of the tank, hose 34 and pump inlet fitting 36, the hydraulic pump 22, the pump outlet fitting 38, conduit 40, adjustable valve 42, hose 44 and inlet 46 at the upper portion of tank 28.

The adjustable valve 42, which advantageously may be a globe valve of a type known in the art, is operated by means of a valve shaft 48 which extends through the outer panel of the dynamometer housing and a manually operable control wheel 50 attached to the valve shaft 48 by means of a suitable nut 52.

It will be understood that when the engine under test is operating, the resulting rotation of hydraulic pump 22 causes the hydraulic fluid to be circulated from the reservoir 30 through the hydraulic pump, the oil conduit and globe valve 42 back into the oil reservoir. The oil pressure that results is dependent upon the speed of rotation of the pump 22 and the status of valve 42. It will be appreciated that the oil circulated through tank 28 may be cooled as by means of suitable cooling coils 51 positioned therein. Cold water or the like is circulated through cooling coils 51 by the pipes 53 and 55 provided at one wall of tank 28.

In accordance with a feature of this invention, a pressure transducer 54 is operatively coupled to the oil conduit 40 at a point intermediate the hydraulic pump 22 and the globe valve 42. As shown in greater detail in FIGURES 2 and 3, the pressure transducer 54 advantageously comprises a piston 56 which is positioned within a cylinder 58. The cylinder 58 is coupled to the oil conduit 40 by an adapter head 60 which advantageously is externally threaded at one end thereof for attachment to conduit 40 and which is internally threaded at the other end for attachment to the cylinder 58. Adapter head 60 is provided with a central bore 62 which terminates in an orifice 64 to the end that the oil pressure built up in the conduit 40 is communicated through bore 52 and orifice 64 to the piston 56. To insure a leak-tight connection between the adapter head 60 and the cylinder 58, and to maintain high accuracy in the measurement of engine horsepower, suitable sealing means, such as O-ring 66, may be provided between the adapter head and the cylinder.

The piston 56 is in abutting relation with an elongated rod 68 which extends through the cylinder into a tubular spring cage 70 where the rod is operatively associated with a resilient member such as the spring 72. Advantageously, the piston rod 68 passes through a central opening in slide carrier 74 and is fastened thereto as by means of set screw 76. It is contemplated that set screw 76 may be adjusted through a suitable aperture 78 provided in the spring cage 70.

The slide carrier 74 is provided with a shoulder 80 extending therearound against which one end of the spring 72 is seated. The other end of spring 72 is seated in a suitable recess provided in end plate 82 which is fastened to the flanged end 84 of the spring cage 70 by the cap screws 86. Thus, spring 72, positioned between movable slide carrier 74 and fixed end plate 82 normally serves to exert a biasing force against the slide carrier to thereby urge piston rod 68 and piston 56 against the pressure of the hydraulic fluid built up in conduit 40 by the operation of the closed volume hydraulic pump 22.

Cylinder 58 is provided with an external thread which is adapted to fit into an internally threaded adapter plate 88. The adapter plate 88 is secured to the flanged end 90 of spring cage 70 by means of the cap screws 92 to the end at the pressure transducer 54 is formed as a composite unitary member of rigid construction. Adapter plate 88 and end plate 82 are provided with suitable apertures for receiving piston rod 68 and for permitting the rod to be slidably movable therethrough. In accordance with a feature of this invention, a surface portion of piston rod 68 is slotted, such as at slot 94, and adapter plate 88 is provided with a guide pin 96 adapted to be fitted into slot 94 to the end that the piston rod 68 is prevented from rotating during its longitudinal movement within the pressure transducer.

In accordance with one preferred embodiment of this invention, the outer diameter of piston 56 and the inner diameter of cylinder 58 are machined so as to form a tight and full engaged fit therebetween. Advantageously, the tolerances for this fit are so fine that the piston cannot be fitted within the cylinder unless a suitable lubricant is provided therefor. As a result of this advantageous construction, it is possible to prevent leakage without the use of a working seal between the piston and the cylinder. In another preferred embodiment (not shown) a suitable seal, such as a block V packing, is utilized with the piston and the cylinder.

These advantageous constructions resolve the prior art problem of break-away friction, a condition which imposed serious limitations upon the range of linear operation of prior art transducers. In a pressure transducer constructed as described above and having a precision spring 72 in spring cage 70, a very wide linear range of operation was achieved with a relative compact construction. It will be appreciated that this range will be dependent upon spring characteristics and the diameter of the cylinder and in one embodiment of the invention constructed for use with the dynamometer assembly, a linear operating range of zero to 1500 lbs. per square inch was attained. This wide linear range of operation is the result of the elimination of leakage and break-away friction in the novel pressure transducer described herein.

Spring cage 70 is provided with an elongated slot 98 extending along a suitable length of the spring cage to the end that a potentiometer slide 100 adapted to extend through slot 98 can be secured to slide carrier 74 for following the movement of the piston rod 68 in response to changes of fluid pressure within the conduit 40. The potentiometer 102 includes a cylindrical core 104 having a resistance wire 106 wound thereon and is mounted on the external surface of spring cage 70, as by screws 108 and supports 110, so as to be positioned in spaced parallel relation to the piston rod 68.

Potentiometer slide 100 advantageously is formed of a resilient metal strip which is adapted to be urged into contact with resistance wire 106 of potentiometer 102. Advantageously, potentiometer slide 100 is insulated from the slide carrier 74 by means of suitable flat insulating members 112, between which slide 100 is sandwiched, and by means of a tubular insulator 114 positioned around screw 116 which secures slide 100 and flat insulating members 112 to slide carrier 74. A suitable aperture 118 is provided through a wall of the spring cage 70 to enable screw 116 to be adjusted when necessary.

An electrical indicating circuit suitable for indicating engine horsepower is shown in FIGURE 4 of the drawing. The indicating circuit comprises a source of D.C. voltage which advantageously may be a D.C. generator 120 coupled by the gear box assembly 20 to the power take off shaft extension 10 so as to be driven by the engine under test. The resistance winding 106 of potentiometer 102 is connected directly across the output of generator 120. Potentiometer slide 100 of potentiometer 102 is connected to a terminal of ammeter 122 which advantageously is marked in terms of horsepower so that the current flow through the meter provides an indication of the engine horsepower. A compensating resistance 142 is connected between potentiometer slide 100 and one terminal of the potentiometer resistance winding 106. It will be appreciated by those skilled in the art that resistance 142 serves to maintain the load relatively constant by compensating for the changes of resistance due to changes of the position of slide 100 on potentiometer resistance winding 106. Thus, in a preferred embodiment of the invention, the resistance of compensating resistance 142 should be approximately equal to the total resistance between points A and B, as shown in FIGURE 4.

The other terminal of ammeter 122 is connected through a balancing potentiometer 124 which compensates for power requirements at different speeds and a current limiting resistance 126 to the D.C. generator 120. A range changing potentiometer 128 is connected in series with a switch 130 across ammeter 122 to enable the range of the ammeter to be changed as desired. In the operation of the invention, balancing potentiometer 124 will be adjusted in accordance with the engine speed to provide operational power regulation of the indicating circuit.

An r.p.m. meter 132 is connected in series with a potentiometer 134 and current limiting resistance 136 across the D.C. generator 120. It will be appreciated by those skilled in the art that since the D.C. generator 120 is driven directly by the engine under test through the gear box assembly 20, the current output of the generator as indicated on the meter 132 will be indicative of the speed of the engine and therefore meter 132 may be marked to indicate engine r.p.m. If desired, a potentiometer 138 and a switch 140 may be connected across a r.p.m. meter 132 for enabling the range of meter 132 to be changed as desired.

In accordance with a specific illustrative embodiment of the invention constructed as described above and shown in FIGURE 4, the components of the electrical indicating circuit had the following representative values:

| | |
|---|---|
| Resistance 142 | ohms 2500 |
| Resistance 136 | do 2200 |
| Resistance 134 | do 4000 |
| Resistance 138 | do 500 |
| Resistance 126 | do 2200 |
| Resistance 124 | do 4000 |
| Resistance 128 | do 500 |
| Resistance 106 | do 500 |
| Generator 120, .6 volts at 1000 r.p.m. | |
| Meters 122 and 132 | milliampere 0–1 |

Advantageously, resistances 128 and 138 should be fractional multiples of the resistances of meters 122 and 132 to obtain the desired multiple scales.

An alternative electrical indicating circuit, suitable for providing remote pressure indications, is shown in FIGURE 5 of the drawing. Advantageously, this circuit comprises a source of D.C. voltage such as battery 150 which has one terminal connected to the resistance winding 106 of potentiometer 102. Potentiometer slide 100 of potentiometer 102 is connected to a terminal of ammeter 154, the other terminal of which is connected through switch 152 to the other side of battery 150.

It will be readily understood that changes in the position of potentiometer slide 100 in response to pressure variations serve to vary the current flow through meter 154 to thereby provide remote pressure indications.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What is claimed is:

A dynamometer assembly for testing and measuring engine horsepower comprising a hydraulic circuit coupled to said engine such that the fluid pressure within said hydraulic circuit is determined by the engine horsepower, a linear pressure transducer connected to said hydraulic circuit having a movable member whose linear movement is responsive to said fluid pressure, a potentiometer including a potentiometer resistance and a potentiometer wiper coupled to said movable member, and an indicating circuit including said potentiometer comprising a source of power connected across said potentiometer resistance, said source of power including a voltage generator coupled to the engine and having a voltage output which varies in accordance with the engine speed, an indicating meter responsive to current flow therethrough for indicating engine horsepower, variable resistance means connected in series with said indicating meter to compensate for power requirements at different engine speeds, one terminal of said variable resistance being connected to said source of power and the other terminal of said variable resistance being connected to said indicating meter, a compensating resistance connected between said potentiometer resistance and said wiper to compensate for load changes when the wiper is moved across said potentiometer resistance, means connecting said wiper to another terminal of said indicating meter, and engine speed indicating means connected across said source of power.

References Cited in the file of this patent

UNITED STATES PATENTS

| | | |
|---|---|---|
| 1,250,414 | Austin | Dec. 18, 1917 |
| 2,127,429 | Schoepf et al. | Aug. 16, 1938 |
| 2,297,644 | Angst | Sept. 29, 1942 |
| 2,669,876 | Lentz | Feb. 23, 1954 |